(12) United States Patent
Wang et al.

(10) Patent No.: US 11,756,331 B2
(45) Date of Patent: Sep. 12, 2023

(54) PORTABLE ELECTRONIC DEVICE AND OPERATION METHOD

(71) Applicant: PIXART IMAGING INC., Hsin-Chu (TW)

(72) Inventors: Guo-Zhen Wang, Hsin-Chu (TW); Han-Chang Lin, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 17/334,600

(22) Filed: May 28, 2021

(65) Prior Publication Data

US 2021/0289136 A1    Sep. 16, 2021

Related U.S. Application Data

(63) Continuation of application No. 15/371,909, filed on Dec. 7, 2016, now abandoned.

(30) Foreign Application Priority Data

Jun. 1, 2016   (TW) ................................ 105117190

(51) Int. Cl.
   *H04N 5/232*   (2006.01)
   *G06K 9/00*   (2022.01)
   (Continued)

(52) U.S. Cl.
   CPC ............ *G06V 40/166* (2022.01); *G06V 10/17* (2022.01); *H04N 23/611* (2023.01); *H04N 23/651* (2023.01); *H04N 23/667* (2023.01)

(58) Field of Classification Search
   CPC ... G06F 3/017; G06F 1/1694; H04N 1/00381; H04N 5/2353; H04N 13/296; G06V 40/166; G06V 10/17
   See application file for complete search history.

(56) References Cited

U.S. PATENT DOCUMENTS 7,633,076 B2 * 12/2009 Huppi ................... G06F 3/0488
                                                         345/169
8,189,100 B2 *  5/2012 Li ........................ H04N 13/239
                                                         348/47
(Continued)

FOREIGN PATENT DOCUMENTS

CN         1794264 A      6/2006
CN       102204232 A      9/2011
(Continued)

OTHER PUBLICATIONS

Hand gesture recognition system; Thakur—2014. (Year: 2014).*
(Continued)

*Primary Examiner* — Luis Perez-Fuentes
(74) *Attorney, Agent, or Firm* — Li & Cai Intellectual Property (USA) Office

(57) ABSTRACT

A portable electronic device is provided. The portable electronic device includes a body, an image sensor and a main system. The image sensor continually captures a first image outside the body, detects at least one motion of a user according to the first image, and generates a control signal related to the motion. The main system receives the control signal from the image sensor and executes a function or a service corresponding to the motion according to the control signal.

7 Claims, 10 Drawing Sheets

(51) Int. Cl.
  *G06V 40/16* (2022.01)
  *G06V 10/10* (2022.01)
  *H04N 23/667* (2023.01)
  *H04N 23/611* (2023.01)
  *H04N 23/65* (2023.01)

(56) References Cited

U.S. PATENT DOCUMENTS

| | | | |
|---|---|---|---|
| 8,923,933 B2 | 12/2014 | Hu | |
| 9,489,051 B2* | 11/2016 | Mankowski | G06F 16/95 |
| 9,576,285 B2* | 2/2017 | Zhou | G06K 19/06112 |
| 9,715,740 B2* | 7/2017 | Jin | G06T 7/254 |
| 10,630,888 B2* | 4/2020 | Parameswaran | H04N 23/676 |
| 2005/0210419 A1* | 9/2005 | Kela | G06F 1/1626 |
| | | | 382/103 |
| 2014/0365981 A1* | 12/2014 | Ranney | G06F 1/1694 |
| | | | 715/863 |

FOREIGN PATENT DOCUMENTS

| | | |
|---|---|---|
| CN | 103677267 A | 3/2014 |
| GB | 2471175 A | 12/2010 |

OTHER PUBLICATIONS

Hand Gesture Recognition in Real Time for Automotive Interfaces; Ohm; 2014. (Year: 2014).*
Survey on visual surveillance of Object motion and behaviors; Hu—2004. (Year: 2004).*
Gesture based interactive mobile phone using a tri-axis accelerometer; Choi—2005. (Year: 2005).*

* cited by examiner

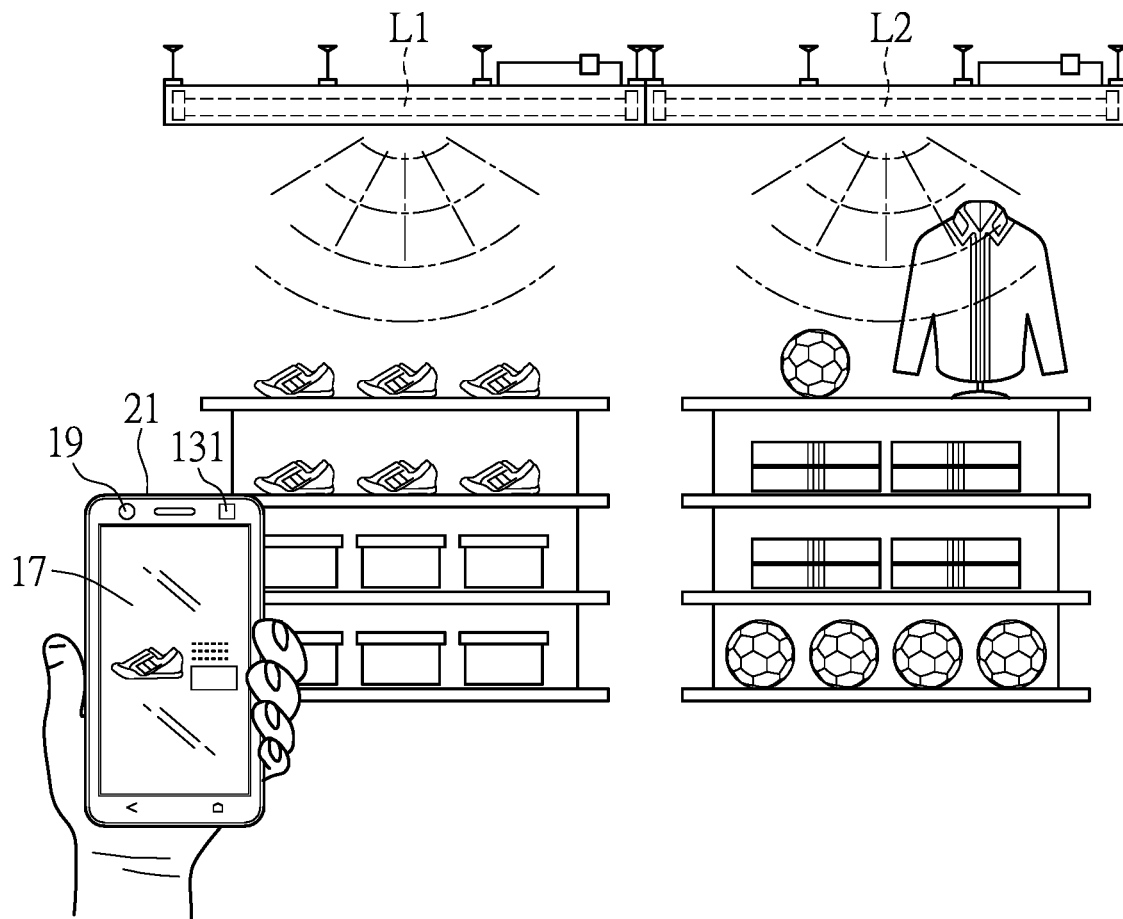

FIG. 14 turning on the image sensor to continually capture a first image outside the body, detecting a flicker frequency of the first image according to the first image, and generating a navigation signal related to the flicker frequency —S151 receiving the navigation signal and obtaining a location information of the portable electronic device by the navigation module according to the navigation signal —S153

FIG. 15

PORTABLE ELECTRONIC DEVICE AND OPERATION METHOD

CROSS-REFERENCE TO RELATED APPLICATIONS

This application is a continuation application of U.S. application Ser. No. 15/371,909, filed on Dec. 7, 2016, and entitled "PORTABLE ELECTRONIC DEVICE AND OPERATION METHOD THEREOF", the entire contents of which are hereby incorporated by reference.

BACKGROUND OF THE INVENTION

1. Field of the Invention

The instant disclosure relates to a portable electronic device; in particular, to a portable electronic device that can analyze low-resolution images and consumes less power.

2. Description of Related Art

Usually, when a portable electronic device captures an image, a built-in baseband circuit of the portable electronic device must turn on a camera to capture a high-resolution image. However, this operation process consumes much power. To reduce the power consumption of the portable electronic device and to make the portable electronic device able to be used in more situations, an improved portable electronic device that can analyze low-resolution images and consumes less power is needed.

SUMMARY OF THE INVENTION

The instant disclosure provides a portable electronic device that can be operated in a suspend state and a work state. The portable electronic device comprises a body, an image sensor, a camera and a recognition module. In the suspend state, the image sensor continually captures a first image outside the body and detects whether there is a face image information in the first image. In the suspend state, the camera captures a second image outside the body after the face image information is detected from the first image. The first image has a first resolution, and the second image has a second resolution. The second resolution is higher than the first resolution. The recognition module recognizes at least one facial feature in the second image. The portable electronic device enters the work state when the recognition module recognizes the correct facial feature.

The instant disclosure further provides an operation method that is applied to a portable electronic device. The portable electronic device that can be operated in a suspend state and a work state, and comprises a body, an image sensor, a camera and a recognition module. The operation method comprises: in the suspend state, turning on the image sensor to continually capture a first image outside the body and to detect whether there is a face image information in the first image, wherein first image has a first resolution; and turning on the camera to capture a second image outside the body after the face image information is detected from the first image, and recognizing at least one facial feature in the second image by the recognition module, wherein the second image has a second resolution and the second resolution is higher than the first resolution. The portable electronic device enters the work state when the recognition module recognizes the correct facial feature.

To sum up, in the portable electronic device and the operation method provided by the instant disclosure, a built-in image sensor can continually detect whether there is a face image information in the first image. Accordingly, it can be determined whether to turn on a camera to capture a second image having higher resolution for recognizing at least one facial feature in the second image. In this manner, in the instant disclosure, the unlocking mechanism of the portable electronic device can be implemented by two-stage face recognitions, which can effectively reduce the power consumption of the portable electronic device.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which:

FIG. 14 is a schematic diagram showing how the portable electronic device shown in FIG. 13 operates.

FIG. 15 shows a flow chart of an operation method applied to a portable electronic device of still another embodiment of the instant disclosure.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for an easy instruction, similar reference numbers or symbols refer to elements alike.

Figure 1:
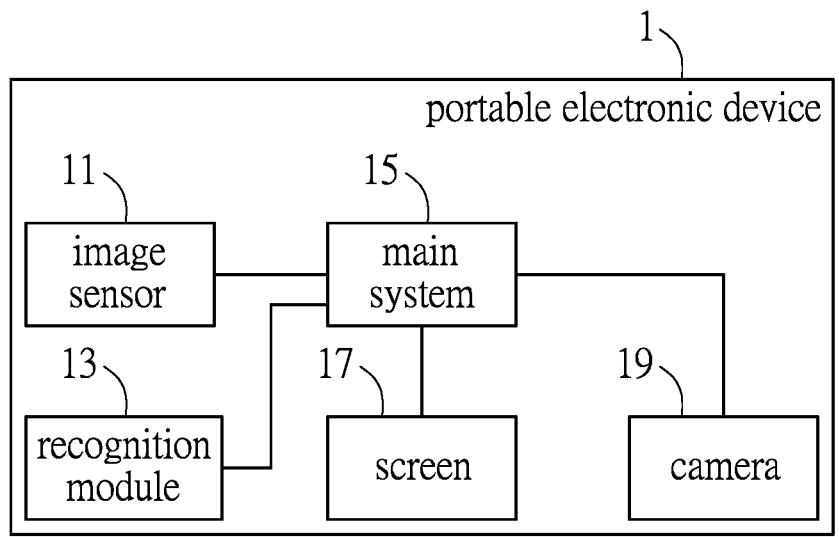
FIG. 1 shows a block diagram of a portable electronic device of one embodiment of the instant disclosure.
Figure 2:
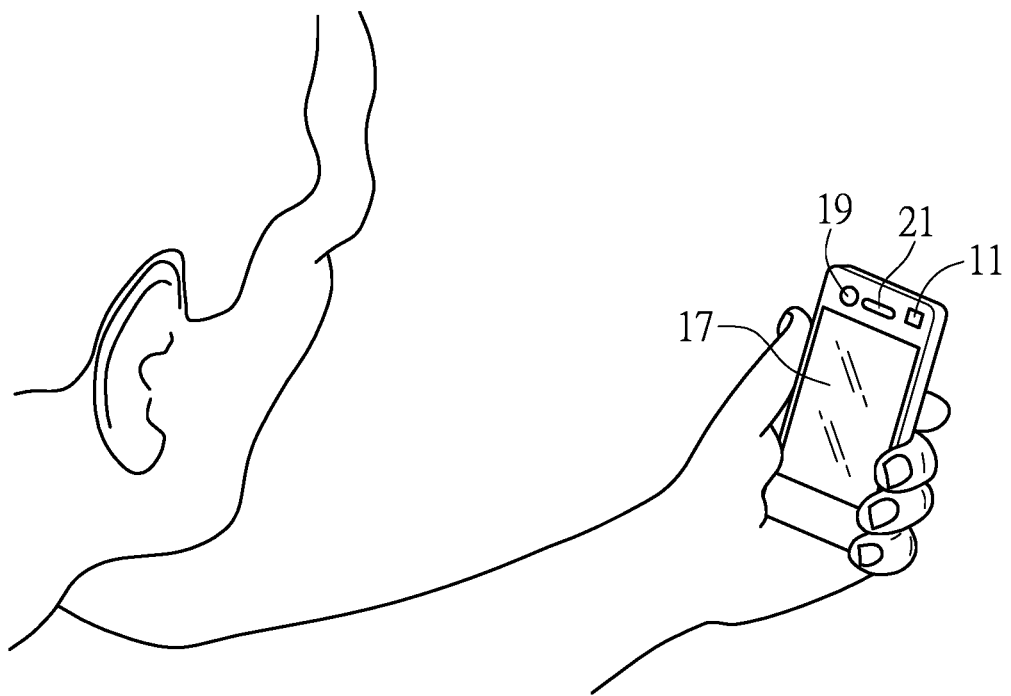
FIG. 2 is a schematic diagram showing how the portable electronic device shown in FIG. 1 operates.

Referring to FIG. 1 and FIG. 2, FIG. 1 shows a block diagram of a portable electronic device of one embodiment of the instant disclosure, and FIG. 2 is a schematic diagram showing how the portable electronic device shown in FIG. 1 operates. The portable electronic device 1 mainly comprises an image sensor 11 and a recognition module 13. The image sensor 11 and the recognition module 13 can be implemented all by hardware or by a combination of hardware and firmware or software, and it is not limited herein. In addition, as shown in FIG. 1, the portable electronic device 1 can also comprise a main system 15, a screen 17 and a camera 19, and they are respectively connected to the main system 15.

The portable electronic device 1 can be a mobile communication device, a personal digital assistant (PDA), a tablet or the like, and it is not limited herein. Take the mobile communication device as an example of the portable electronic device 1 shown in FIG. 2. The portable electronic device 1 further comprises a body 21. The image sensor 11, the screen 17 and the camera 19 can be exposed on the same surface which is part of the housing of the body 21. The recognition module 13 and the main system 15 are configured inside the body 21. The positions where the image sensor 11, the screen 17 and the camera 19 are configured are not limited by FIG. 2. That is, the positions where the image sensor 11, the screen 17 and the camera 19 are configured can be designed based on need.

The portable electronic device 1 can be operated in a suspend state and a work state. When the portable electronic device 1 enters the work state, the screen 17 of the portable electronic device 1 is turned on and the main system 15 can execute a function or a service required by a user according to their operation. In addition, when the user has not operated the portable electronic device 1 for a period of time, the portable electronic device 1 is switched to the suspend state. Thus, the power supply to the main system 15 is temporarily cut. The main system 15 enters a power-saving mode and the screen 17 is also turned off to reduce the power consumption of the portable electronic device 1, until the portable electronic device 1 is again operated in the work state.

Specifically speaking, the image sensor 11 is an always-on image sensor, which has low power consumption and can analyze low-resolution images. When the portable electronic device 1 is operated in the suspend state, the image sensor 11 is turned on to continually capture a first image outside the body 21 and to detect whether there is a face image information in the first image. The first image has a first resolution. For the convenience of unlocking the screen 17 (that is, to switch the portable electronic device 1 to the work state), the image sensor 11 and the screen 17 can be configured on the same surface, which is part of the housing of the body 21, but it is not limited herein. In this manner, the first image continually captured and detected by the image sensor 11 shows the scene in front of the screen 17. As shown in FIG. 2, the user tends to unlock the screen 17 because he tends to operate the portable electronic device 1 to execute certain function or service (at this moment, the portable electronic device 1 is still operated in the suspend state), and the image sensor 11 is turned on to continually capture and detect the first image outside the body 21. In addition, after a face image information is detected from the first image, the image sensor 11 accordingly outputs an actuation signal to the main system 15, such that the camera 19 and the recognition module 13 are activated by the main system 15.

To prevent the image sensor 11 from wrongly detecting a face image information from the first image, more image sensors 11 can be used or conditions to determine whether the face image information is correctly detected from the first image can be added. For example, after the face image information in the first image is detected by the image sensor 11, the image sensor 11 needs to further determine whether the face image information has appeared for over two seconds. Only when the image sensor 11 detects the face image information in the first image and the face image information has appeared for over two seconds, will the image sensor 11 output an actuation signal to the main system 15, such that the camera 19 and the recognition module 13 are activated by the main system 15. These conditions to determine whether the face image information is correctly detected from the first image are just examples but not for restricting the instant disclosure.

In the suspend state, after the face image information in the first image is detected by the image sensor 11, the camera 19 captures a second image outside the body 21. The second image has a second resolution, and the second resolution is higher than the first resolution. The recognition module 13 is configured in the body 21 to recognize at least one facial feature in the second image. The recognition module 13 is connected to the main system 15. The recognition module 13 can be activated by the main system 15 to recognize at least one facial feature in the second image through the camera 19. The camera 19 can be a VGA camera built in the portable electronic device 1, which, compared with the image sensor 11, can provide images having higher resolution (that is, the second image). Still for the convenience of unlocking the screen 17, the camera 19 is considered to be the front camera of the portable electronic device 1, as shown in FIG. 2. Thus, the second image captured by the camera 19 is the scene in front of the screen 17. After the face image information is detected from the first image, the portable electronic device 1 turns on the camera 19 to capture the second image, which shows the scene in front of the screen 17. After that, the recognition module 13 recognizes at least one facial feature in the second image.

After the recognition module 13 recognizes at least one correct facial feature, the recognition module 13 determines that the user has a legal identification to operate the portable electronic device 1 for executing a function or a service, so the main system 15 leaves the power-saving mode and the screen 17 is unlocked. Thus, the portable electronic device 1 is switched from the suspend state to the work state to execute a function or a service. On the other hand, when the recognition module 13 has not yet correctly recognized the facial feature, the portable electronic device 1 will not be switched from the suspend state to the work state and the screen 17 will not be turned on, which can prevent the user that does not have a legal identification from operating the portable electronic device 1 for executing a function or a service. Details about the mechanism for recognizing facial features are easily understood by those skilled in the art and thus they will not be described herein.

One of the main achievements of the portable electronic device 1 is that, the built-in image sensor 11 continually captures and detects whether there is a face image information in the first image, and then determines whether to turn on the camera 19 to capture the second image having higher resolution. After that, the recognition module 13 detects at least one facial feature in the second image. In this manner, the unlocking mechanism of the portable electronic device 1 can be implemented by a two-stage face recognition, which can effectively reduce the power consumption of the portable electronic device 1.

More specifically, the first-stage face recognition is to use the image sensor 11 that is always on to determine whether there is a face image information detected in the first image that shows the scene in front of the screen 17, and to accordingly determine whether to start the second-stage face recognition. In the second-stage face recognition, the portable electronic device 1 turns on the camera 19 to capture images having higher resolution and turns on the recognition module 13 to analyze high-resolution images, to determine whether the user has a legal identification to operate the portable electronic device 1 for executing a function or a service.

When the portable electronic device 1 is switched from the suspend state to the work state, the image sensor 11 is switched to the power-saving mode. The image sensor 11 will be turned on to continually capture and detect the first image outside the body 21 until the portable electronic device 1 has been switched from the work state to the suspend state because it has not been operated for a period of time. In addition, when the portable electronic device 1 is operated in the suspend state and when the image sensor 11 has not yet detected the face image information from the first image, the recognition module 13 does not need to be activated and the camera 19 does not need to be turned on. The power consumption of the portable electronic device 1 can be reduced because the recognition module 13 and the camera 19 are both off. The recognition module 13 will be activated and the camera 19 will be turned on when the main system 15 receives an actuation signal from the image sensor 11.

Figure 3:
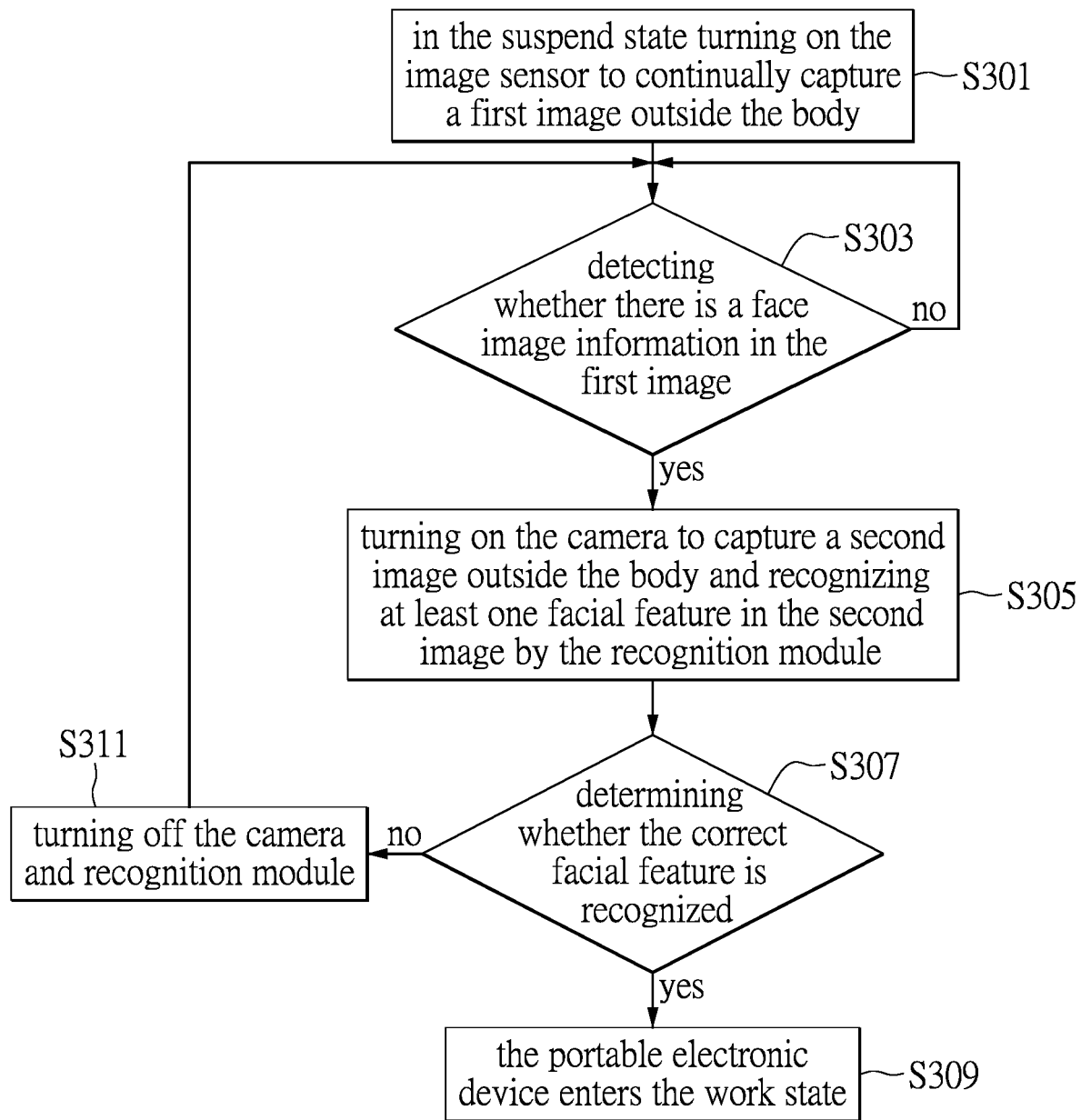
FIG. 3 shows a flow chart of an operation method applied to a portable electronic device of one embodiment of the instant disclosure.

In order to further illustrate the operation method applied to the portable electronic device 1, there is one embodiment provided as below. Referring to FIG. 3, FIG. 3 shows a flow chart of an operation method applied to a portable electronic device of one embodiment of the instant disclosure. The method of this embodiment is executable for a portable electronic device 1 as shown in FIG. 1 and FIG. 2, and thus please refer to FIG. 1 and FIG. 2 for better understanding.

In step S301, after the portable electronic device 1 is turned on but has been not operated for a period of time, the portable electronic device 1 is switched from the work state to the suspend state. In the suspend state, the image sensor 11 is turned on to continually capture a first image outside the body 21. The first image has a first resolution. In step S303, the image sensor 11 detects whether there is a face image information in the first image. After that, in step S305, if there is a face image information detected from the first image, the camera 19 is turned on to capture a second image outside the body 21. In addition, the recognition module 13 is also activated to recognize at least one facial feature in the second image. The second image has a second resolution, and the second resolution is higher than the first resolution. In the step S307, it is determined whether the correct facial feature is recognized. Finally, in step S309, if the recognition module 13 correctly recognizes the facial feature, the portable electronic device 1 is switched from the suspend state to the work state. At the same time, the image sensor 11 is switched to the power-saving mode. On the other hand, if the portable electronic device 1 is switched from the work state to the suspend state, the recognition module 13 and the camera 19 are both turned off to reduce the power consumption of the portable electronic device 1.

Again referring to FIG. 3, if the recognition module 13 does not recognize the correct facial feature, the portable electronic device 1 will not be switched to the work state and the screen 17 will not be turned on, which can prevent a user that does not have a legal identification from operating the portable electronic device 1 for executing a function or a service. Thus, in step S311, if the recognition module 13 does not recognize the correct facial feature, the recognition module 13 and the camera 19 are both turned off, and it returns to step S303.

In the portable electronic device and the operation method provided in this embodiment, a built-in image sensor can continually detect whether there is a face image information in the first image. Accordingly, it can be determined whether to turn on a camera to capture a second image having higher resolution for recognizing at least one facial feature in the second image. In this manner, the unlocking mechanism of the portable electronic device can be implemented by a two-stage face recognition, which can effectively reduce the power consumption of the portable electronic device.

Figure 4:
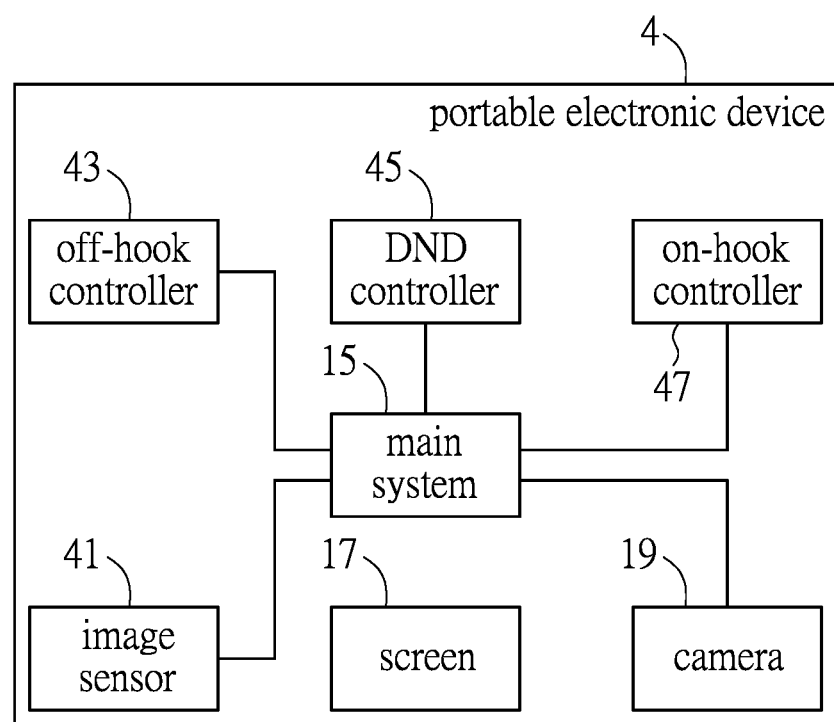
FIG. 4 shows a block diagram of a portable electronic device of another embodiment of the instant disclosure.
Figure 5A:
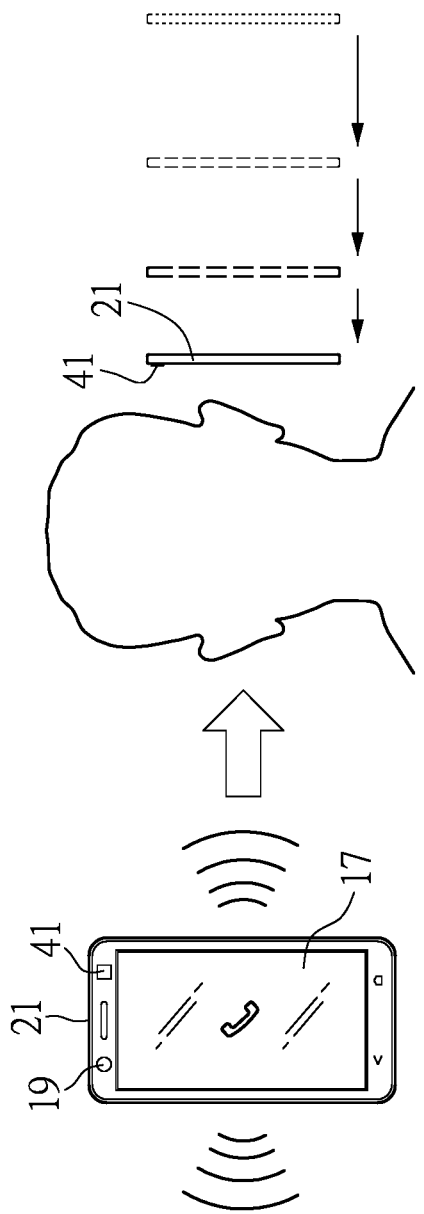
FIG. 5A is a schematic diagram showing how a call is answered by the portable electronic device shown in FIG. 1.
Figure 5B:
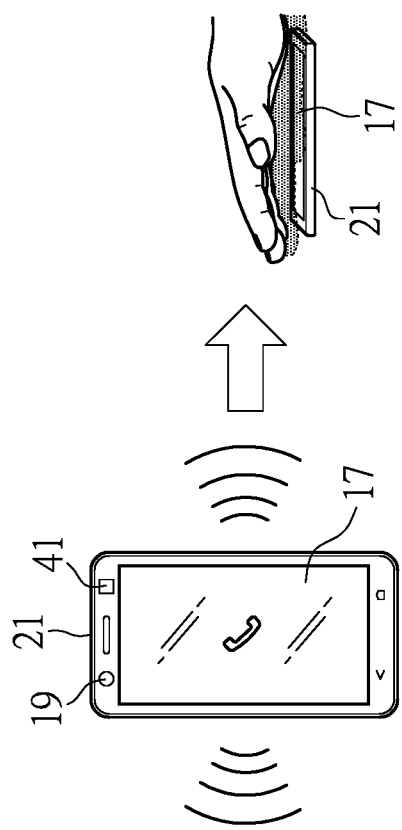
FIG. 5B is a schematic diagram showing how a call is declined by the portable electronic device shown in FIG. 1.

Referring to FIG. 4, FIG. 5A and FIG. 5B, FIG. 4 shows a block diagram of a portable electronic device of another embodiment of the instant disclosure, FIG. 5A is a schematic diagram showing how a call is answered by the portable electronic device shown in FIG. 1, and FIG. 5B is a schematic diagram showing how a call is declined by the portable electronic device shown in FIG. 1. Like reference numbers in FIGS. 4, 5A and 5B and FIGS. 1 and 2 refer to like elements throughout.

In addition to an image sensor 41, a main system 15, a screen 17 and a camera 19, the portable electronic device 4 shown in FIG. 4 also comprises an off-hook controller 43 and a DND controller (Do Not Disturb controller; DND controller) 45. The off-hook controller 43 and the DND controller 45 can be implemented all by hardware or by a combination of hardware and firmware or software, and it is not limited herein. In addition, the off-hook controller 43 and the DND controller 45 can be integrated in the main system 15 or be configured separately. Take a mobile communication device as an example of the portable electronic device 4 shown in FIG. 5A or FIG. 5B. The portable electronic device 4 also comprises a body 21. The image sensor 41, the screen 17 and the camera 19 can be exposed on the same surface which is part of the housing of the body 21. The main system 15, the off-hook controller 43 and the DND controller 45 are configured in the body 21.

The image sensor 41 continually captures a first image outside the body 21 and detects whether there is a first predetermined object or a second predetermined object in the first image. When the portable electronic device 4 receives a call, the off-hook controller 43 can control the portable electronic device 4 to answer the call, or the DND controller 45 can control the portable electronic device 4 to decline the call. The working mechanism for answering or declining a call is easily understood by the skilled in the art, and thus details about how the off-hook controller 43 or the DND controller 45 controls the portable electronic device 4 to answer or decline a call are not described herein. Briefly speaking, by determining whether there is a first predetermined object or a second predetermined object detected in the first image, the off-hook controller 43 or the DND controller 45 in the portable electronic device 4 can determine whether to answer or decline a call.

Usually, when a portable electronic device receives a call, the contact information of the caller is shown on the screen, such as the name, the identification number, the phone number or the like. A user can determine to answer or to decline the call based on this contact information shown on the screen. However, the user always needs to push buttons or touch the screen to control the portable electronic device to answer or to decline the call, which may be not be convenient because sometimes the user may not be free or may be too busy to push buttons or touch the screen of his portable electronic device.

In this embodiment, when the portable electronic device 4 receives a call, the image sensor 41 is turned on to continually capture a first image outside the body 21. When there is a first predetermined object or a second predetermined object detected in the first image, the portable electronic device 4 accordingly determines to answer or decline the call. As shown in FIG. 5A, if there is a first predetermined object detected in the first image, such as the user's ear, the image sensor 41 outputs a first actuation signal to the main system 15. As a result, the main system 15 activates the off-hook controller 43 to control the portable electronic device 4 to answer the call. On the other hand, as shown in FIG. 5B, if there is a second predetermined object detected in the first image, such as the user's palm, the image sensor 41 outputs a second actuation signal to the main system 15. As a result, the main system 15 activates the DND controller 45 to control the portable electronic device 4 to decline the call. In this manner, the portable electronic device 4 uses the image sensor 41 that can analyze lower-resolution images and has low power consumption to recognize predetermined objects to further answer or decline a call. In other words, the portable electronic device 4 can automatically determine to answer or to decline a call, so a user does not need to do it manually.

To prevent the image sensor 41 from wrongly determining whether there is a first predetermined object or a second predetermined object in a first image, more image sensors 41 can be used or the conditions to determine whether there is the first predetermined object or the second predetermined object in a first image can be added. For example, the image sensor 41 not only needs to detect whether there is the first predetermined object or the second predetermined object in a first image, but also needs to detect changes in the distance between the first predetermined object and the portable electronic device 4 and the distance between the second predetermined object and the portable electronic device 4. In this manner, only when the image sensor 41 detects the first predetermined object, such as the user's ear, that is approaching the portable electronic device 4, does the image sensor 41 output a first actuation signal to the main system 15. As a result, the main system 15 activates the off-hook controller 43 to control the portable electronic device 4 to answer the call. On the other hand, only when the image sensor 41 detects the second predetermined object, such as the user's palm, that is approaching the portable electronic device 4, the image sensor 41 outputs a second actuation signal to the main system 15. As a result, the main system 15 activates the DND controller 45 to control the portable electronic device 4 to decline the call. However, these conditions to determine whether there is a first predetermined object or a second predetermined object detected in a first image are just examples and not for restricting the instant disclosure.

When a call is declined, the image sensor 41 is switched to a power-saving mode to reduce the power consumption of the portable electronic device 4. The image sensor 41 will be turned on again when the portable electronic device 4 receives the next call. Again referring to FIG. 4, the portable electronic device 4 can further comprise an on-hook controller 47 that is also configured in the body 21. The on-hook controller 47 can be implemented all by hardware or by a combination of hardware and firmware or software, and it is not limited herein. In addition, the on-hook controller 47 and the DND controller 45 can be integrated or separately configured.

After a call is answered, the on-hook controller 47 can control the portable electronic device 4 to go on-hook. Specifically speaking, after a call is answered, the image sensor 41 keeps capturing and detecting the first image outside the body 21. The image sensor 41 outputs a third actuation signal to the main system 15 when there is a third predetermined object (not shown) in the first image detected by the image sensor 41. According to the third actuation signal, the main system 15 activates the on-hook controller 47 to control the portable electronic device 4 to go on-hook.

Figure 6:
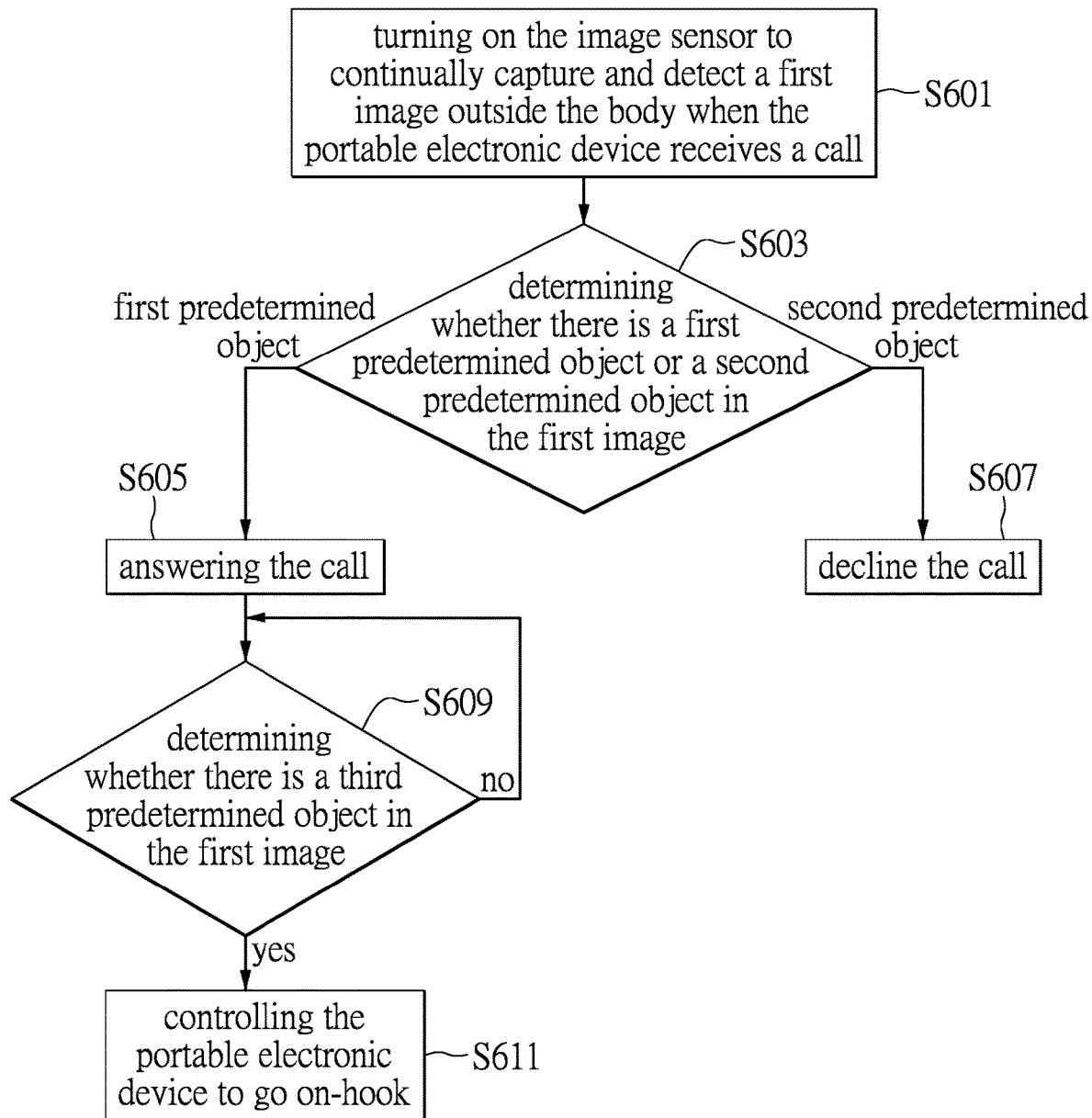
FIG. 6 shows a flow chart of an operation method applied to a portable electronic device of another embodiment of the instant disclosure.

In order to further illustrate the operation method applied to the portable electronic device 4, another embodiment is provided as below. Referring to FIG. 6, FIG. 6 shows a flow chart of an operation method applied to a portable electronic device of another embodiment of the instant disclosure. The method of this embodiment is executable for a portable electronic device 4 as shown in FIGS. 4, 5A and 5B, and thus please refer to FIGS. 4, 5A and 5B for better understanding.

In step S601, when the portable electronic device 4 receives a call, the image sensor 41 is tuned on to continually capture and detect a first image outside the body 21. In step S603, the image sensor 41 determines whether there is a first predetermined object or a second predetermined object detected in the first image. If it is determined that a first predetermined object is detected in the first image, in step S605, the portable electronic device 4 determines to answer the call (that is, the off-hook controller 43 controls the portable electronic device 4 to answer the call). In addition, if it is determined that a second predetermined object is detected in the first image, in step S607, the portable electronic device 4 determines to decline the call (that is, the DND controller 45 controls the portable electronic device 4 to decline the call).

After the call is answered, the image sensor 41 keeps capturing and detecting the first image outside the body 21. Thus, in step S609, the image sensor 41 further determines whether there is a third predetermined object in the first image. If the image sensor 41 determines that there is the third predetermined object in the first image, in step S611, the portable electronic device 4 determines to decline the call (that is, the on-hook controller 47 is activated to control the portable electronic device 4 to go on-hook). It is worth mentioning that, the image sensor 41 can only analyze low-resolution images and has low power consumption, so the resolution of first images captured by the image sensor 41 must be much lower than the resolution of second images captured by the camera 19 which is built in the portable electronic device 4. Moreover, when a call is declined, the image sensor 41 is switched to a power-saving mode to reduce the power consumption of the portable electronic device 4. The image sensor 41 will be turned on again when the portable electronic device 4 receives the next call.

Figure 7:
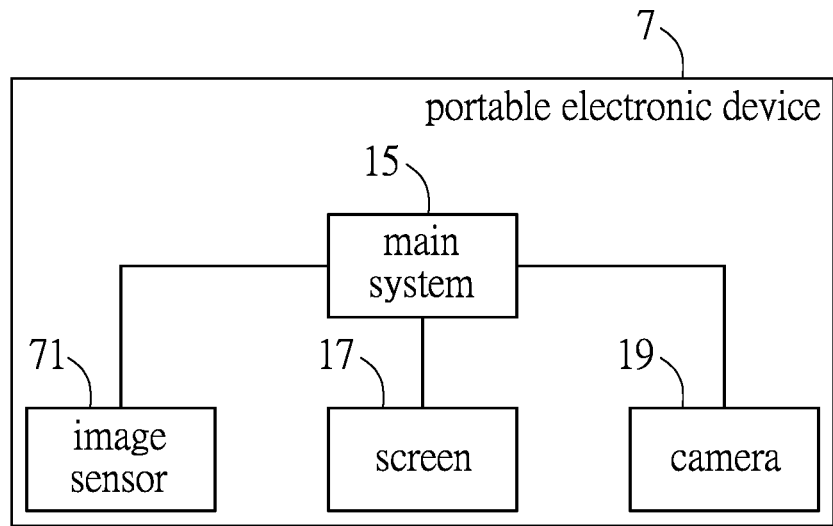
FIG. 7 shows a block diagram of a portable electronic device of still another embodiment of the instant disclosure.
Figure 8:
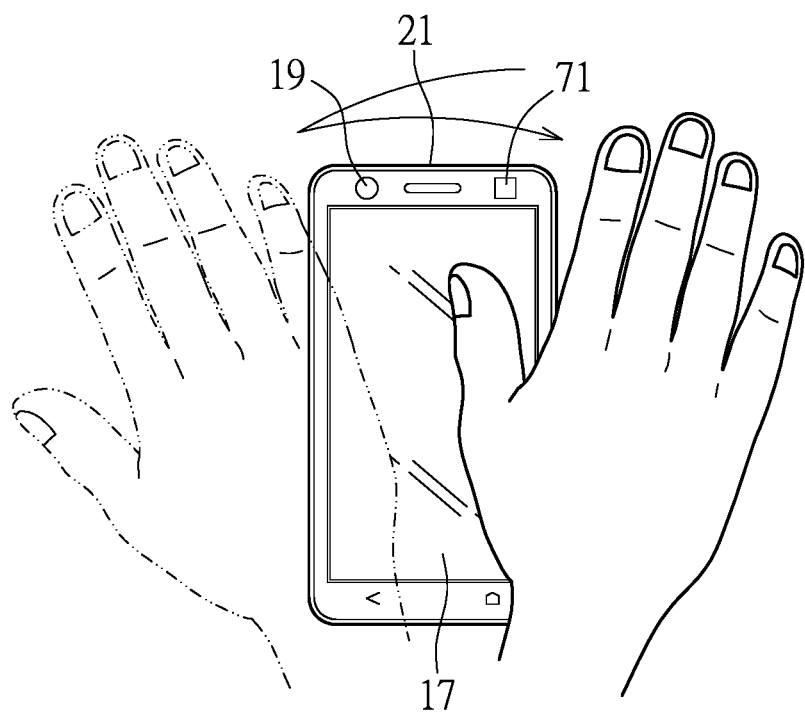
FIG. 8 is a schematic diagram showing how the portable electronic device shown in FIG. 7 operates.

Referring to FIG. 7 and FIG. 8, FIG. 7 shows a block diagram of a portable electronic device of still another embodiment of the instant disclosure, and FIG. 8 is a schematic diagram showing how the portable electronic device shown in FIG. 7 operates. Like reference numbers in FIGS. 7 and 8, and FIGS. 1-2, 4, 5A and 5B refer to like elements throughout.

The portable electronic device 7 mainly comprises an image sensor 71, a main system 15, a screen 17 and a camera 19. The image sensor 71 and the main system 15 can be implemented all by hardware or by a combination of hardware and firmware or software, and it is not limited herein. In addition, the image sensor 71 can be integrated into the main system 15 or be configured outside the main system 15.

Take a mobile communication device as an example of the portable electronic device 7 shown in FIG. 8. The portable electronic device 7 also comprises a body 21. The image sensor 71, the screen 17 and the camera 19 can be exposed on the same surface which is part of the housing of the body 21. The main system 15 is configured in the body 21. The position where the image sensor 71 is configured is not limited by FIG. 8. That is, the position where the image sensor 71 is configured can be designed based on need.

The image sensor 71 continually captures a first image outside the body 21. In addition, the image sensor 71 detects at least one motion of a user to generate a control signal according to the detected motion. Compared with the image sensor 11 shown in FIG. 1 and the image sensor 41 shown in FIG. 4, the image sensor 71 shown in FIG. 7 can do more complex motion recognition, by which the image sensor 71 can recognize and analyze a gesture, a number of fingers and/or a moving direction in the captured first image. Accordingly, the image sensor 71 obtains at least one motion of the user and generates a control signal relevant to the motion of the user. It is worth mentioning that, the image sensor 71 can only analyze low-resolution images and has low power consumption, so the resolution of first images captured by the image sensor 71 must be much lower than the resolution of second images captured by the camera 19 which is built in the portable electronic device 7. Moreover, the image sensor 71 can be an always-on image sensor, and the conditions to turn on the image sensor 71 are not restricted. In other words, a user can design the conditions that the portable electronic device 7 needs to turn on the image sensor 71 based on his need.

Figure 9:
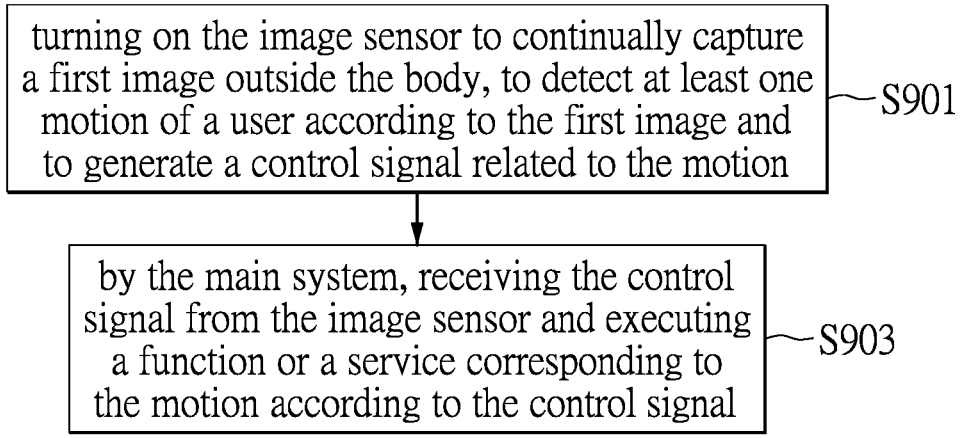
FIG. 9 shows a flow chart of an operation method applied to a portable electronic device of still another embodiment of the instant disclosure.

After the image sensor 71 is turned on, the main system 15 receives the control signal from the image sensor 71, and correspondingly executes a function or a service. For example, after the image sensor 71 recognizes and analyzes a gesture, a number of fingers and/or a moving direction in the captured first image, the image sensor 71 obtains a motion of the user, which is "waving palm left and right". Thus, the image sensor 71 generates a control signal relevant to the motion "waving palm left and right" to the main system 15. Receiving the control signal, the main system 15 learns the motion corresponding to this control signal is "waving palm left and right" by checking a look-up table. Finally, the main system 15 executes a function or a service which corresponds to this motion "waving palm left and right", such as an audio broadcasting service. The above example is only for illustrating but not for restricting the instant disclosure In order to further illustrate the operation method applied to the portable electronic device 7, another embodiment is provided as below. Referring to FIG. 9, FIG. 9 shows a flow chart of an operation method applied to a portable electronic device of still another embodiment of the instant disclosure. The method of this embodiment is executable for a portable electronic device 7 as shown in FIGS. 7 and 8, and thus please refer to FIGS. 7 and 8 for better understanding.

In step S901, the image sensor 71 is turned on to continually capture a first image outside the body 21. In addition, the image sensor 71 detects at least one motion of a user according to the captured first image, and generates a control signal according to this detected motion of the user. In step S903, the main system 15 receives the control signal from the image sensor 71, and correspondingly executes a function or a service according to the control signal.

More specifically, in step S901, the image sensor 71 detects at least one motion of the user according to a gesture, a number of fingers and/or a moving direction in the captured first image.

Figure 10:
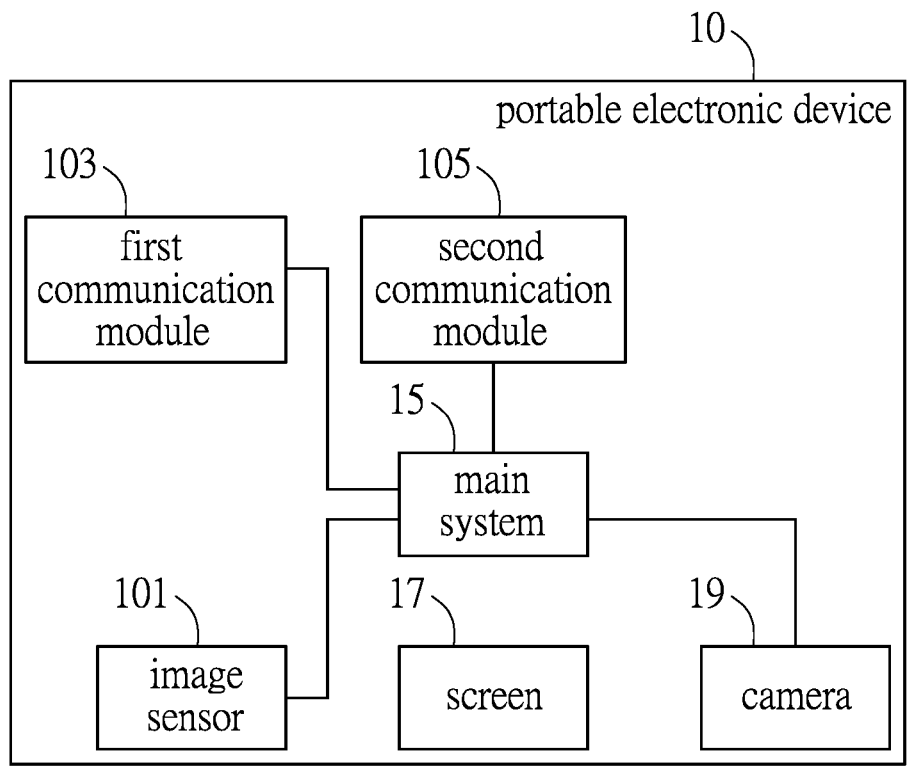
FIG. 10 shows a block diagram of a portable electronic device of still another embodiment of the instant disclosure.
Figure 11:
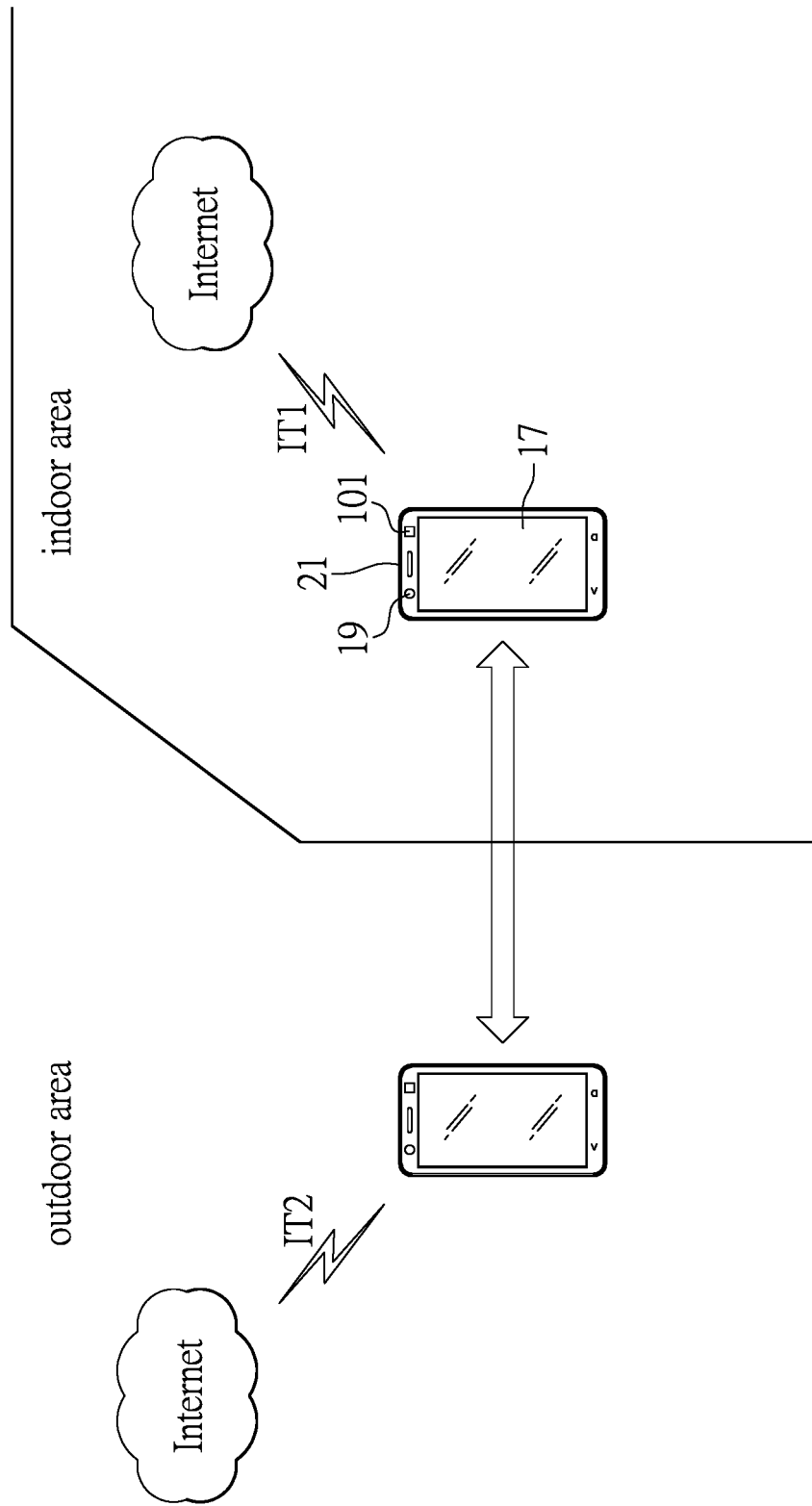
FIG. 11 is a schematic diagram showing how the portable electronic device shown in FIG. 10 operates.

Referring to FIG. 10 and FIG. 11, FIG. 10 shows a block diagram of a portable electronic device of still another embodiment of the instant disclosure, and FIG. 11 is a schematic diagram showing how the portable electronic device shown in FIG. 10 operates. Like reference numbers in FIGS. 10 and 11, and FIGS. 1-9, refer to like elements throughout.

The portable electronic device 10 mainly comprises an image sensor 101, a main system 15, a screen 17, a camera 19, a first communication module 103 and a second communication module 105. The image sensor 101, the main system 15, the first communication module 103 and the second communication module 105 can be implemented all by hardware or by a combination of hardware and firmware or software, and it is not limited herein. In addition, the image sensor 101, the main system 15, the first communication module 103 and the second communication module 105 can be integrated and configured separately.

Take a mobile communication device as an example of the portable electronic device 10. The portable electronic device 10 further comprises a body 21. The image sensor 101, the screen 17 and the camera 19 can be exposed on the same surface which is part of the housing of the body 21. The main system 15, the first communication module 103 and the second communication module 105 are configured inside the body 21. The position where the image sensor 101 is configured is not limited by FIG. 11. That is, the position where the image sensor 101 is configured can be designed based on need.

Specifically speaking, the image sensor 101 continually captures a first image outside the body 21, and determines whether the portable electronic device 10 is located indoors or outdoors according to the captured first image. Moreover, the first communication module 103 controls the portable electronic device 10 to connect to the Internet through a first network IT1, and the second communication module 105 controls the portable electronic device 10 to connect to the Internet through a second network IT2. The first network IT1 can be the Wi-Fi network, and the second network IT2 can be the 3G communication network or the 4G communication network, but it is not limited herein. After the image sensor 101 determines whether the portable electronic device 10 is located indoors or outdoors, it can be determined whether to activate the first communication module 103 or the second communication module 105 to make the portable electronic device connect to the Internet through the first network IT1 or the second network IT2.

The conditions to turn on the image sensor 101 are not restricted. In other words, a user can design the conditions under which the portable electronic device 10 needs to turn on the image sensor 101 based on his need. For example, as shown in FIG. 11, the image sensor 101 is turned on, and when the image sensor 101 determines that the portable electronic device is located indoors, the first communication module 103 is activated to control the portable electronic device 10 to connect to the Internet through the first network IT1 (e.g., the Wi-Fi network). On the other hand, when the image sensor 101 determines that the portable electronic device is located outdoors, the second communication module 105 is activated to control the portable electronic device 10 to connect to the Internet through the second network IT2 (e.g., the 3G communication network or the 4G communication network).

Thus, for the portable electronic device 10 provided in this embodiment, the built-in image sensor 101 can detect and then determine that the portable electronic device is located indoors or outdoors. After that, it can be determined that the portable electronic device 10 is supposed to connect to the Internet through the first network IT1 or the second network IT2. In this embodiment, the image sensor 101 has low power consumption and can not only capture and analyze low-resolution images, but also can recognize the scene or the environment to automatically and appropriately choose a network to connect to the Internet. Thus, a user does not need to manually operate the portable electronic device 10 to choose a network to connect to the Internet and it is very convenient.

More specifically, the image sensor 101 determines that the portable electronic device 10 is located indoors or outdoors according to a flicker frequency and/or an exposure time of the captured first image. For example, because of the exposure to the fluorescent light, the flicker frequency of the image captured indoors is higher than the flicker frequency of the image captured outdoors. Thus, the image sensor 101 can determine that the portable electronic device 10 is located indoors if the flicker frequency of the captured first image is higher than a threshold frequency. On the other hand, because of the exposure to the natural light, the exposure time of the image captured outdoors is longer than the exposure time of the image captured indoors. Thus, the image sensor 101 can determine that the portable electronic device 10 is located outdoors if the exposure time of the captured first image is longer than a threshold time. The above examples are only for illustrating but not for restricting the instant disclosure.

Figure 12:
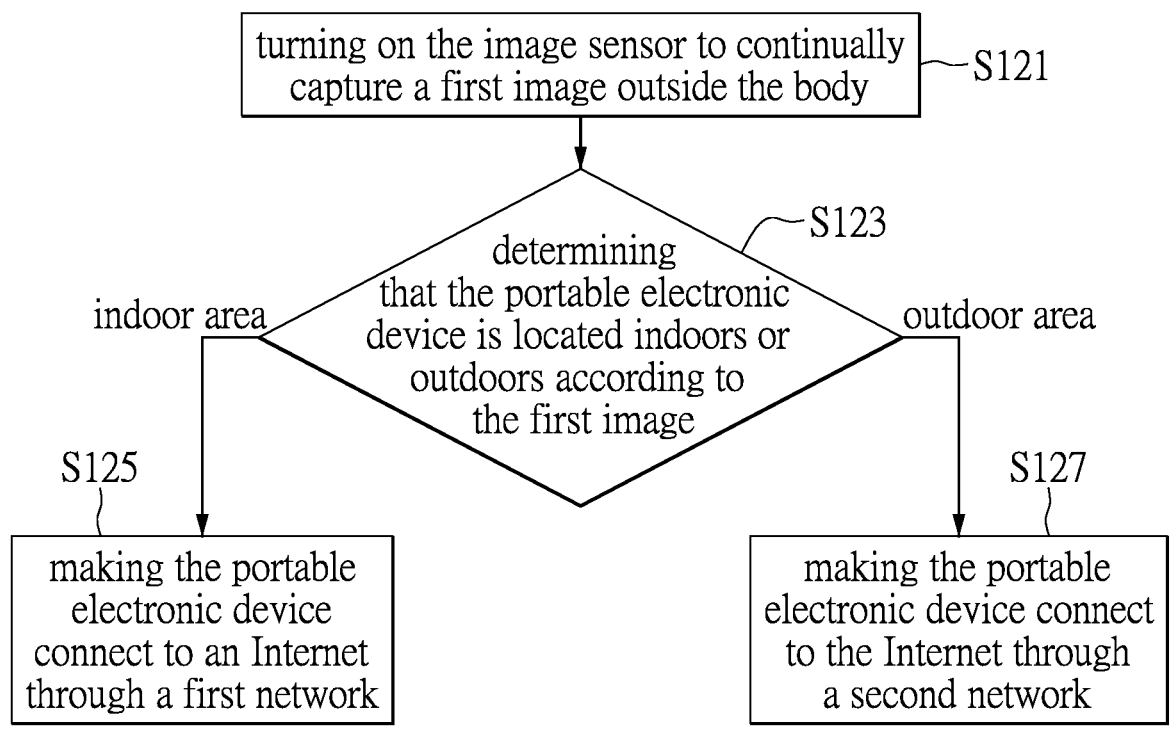
FIG. 12 shows a flow chart of an operation method applied to a portable electronic device of still another embodiment of the instant disclosure.

In order to further illustrate the operation method applied to the portable electronic device 10, another embodiment is provided as below. Referring to FIG. 12, FIG. 12 shows a flow chart of an operation method applied to a portable electronic device of still another embodiment of the instant disclosure. The method of this embodiment is executable for a portable electronic device 10 as shown in FIGS. 10 and 11, and thus please refers to FIGS. 10 and 11 for better understanding.

In step S121, the image sensor 101 is turned on to continually capture a first image outside the body 21. In step S123, the image sensor 101 determines that the portable electronic device 10 is located indoors or outdoors according to the first image. After that, in step S125, the portable electronic device 10 connects to the Internet through the first network IT1 if the portable electronic device 10 is located indoors. On the other hand, in step S127, the portable electronic device 10 connects to the Internet through the second network IT2 if the portable electronic device 10 is located outdoors.

Figure 13:
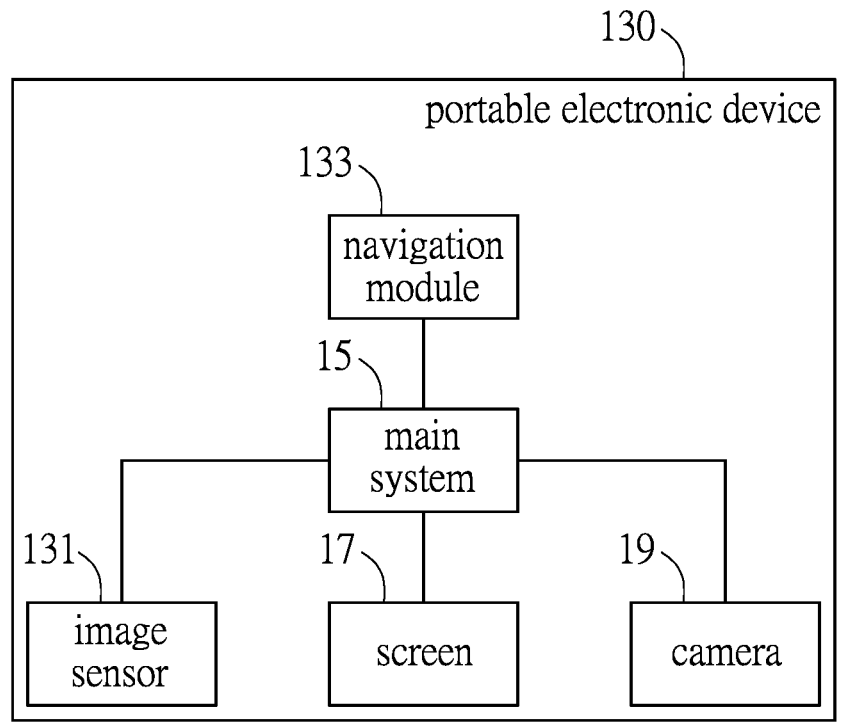
FIG. 13 shows a block diagram of a portable electronic device of still another embodiment of the instant disclosure.

The flicker frequency of the image may vary with the exposures of different fluorescent lamps. Moreover, the flicker frequency can be also defined as the coding data for the data transmission used in navigation or broadcasting, especially indoor navigation or indoor broadcasting. Referring to FIG. 13 and FIG. 14, FIG. 13 shows a block diagram of a portable electronic device of still another embodiment of the instant disclosure, and FIG. 14 is a schematic diagram showing how the portable electronic device shown in FIG. 14 operates. Like reference numbers in FIGS. 13 and 14, and FIGS. 1-12 refer to like elements throughout.

The portable electronic device 130 mainly comprises an image sensor 131, a main system 15, a screen 17, a camera 19 and a navigation module 133. The image sensor 131, the main system 15 and the navigation module 133 can be implemented all by hardware or by a combination of hardware and firmware or software, and it is not limited herein. In addition, the image sensor 131, the main system 15 and the navigation module 133 can be integrated or configured separately.

Take a mobile communication device as an example of the portable electronic device 130 shown in and FIG. 13 and FIG. 14. The portable electronic device 130 further comprises a body 21. The image sensor 131, the screen 17 and the camera 19 are exposed on the same surface which is part of the housing of the body 21. The main system 15 and the navigation module 133 are configured inside the body 21. The position where the image sensor 131 is configured is not limited by FIG. 13. That is, the position where the image sensor 131 is configured can be designed based on need.

The image sensor 131 continually captures a first image outside the body 21. In addition, the image sensor 131 detects the flicker frequency of the first image and generates a navigation signal according to the flicker frequency. The first image has a first resolution. When the image sensor 131 is turned on, the navigation module 133 receives the navigation signal from the image sensor 131, and obtains a location information of the portable electronic device 130 according to the navigation signal. The conditions to turn on the image sensor 131 are not limited herein.

As shown in FIG. 14, if the flicker frequency of an LED lamp L1 and the flicker frequency of an LED lamp L2 are not equal, when the portable electronic device 130 is exposed to the light emitted by the LED lamp L1, the image sensor 131 detects the flicker frequency of the LED lamp L1 and generates a navigation signal according to the detected flicker frequency. After receiving the navigation signal, the navigation module 133 can learn that the flicker frequency corresponding to the navigation signal is the flicker frequency of the LED lamp L1 by checking a look-up table. In this manner, the navigation module 133 can determine that the portable electronic device 130 is within the irradiation range of the LED lamp L1 according to the location information of the portable electronic device 130.

On the other hand, when the portable electronic device 130 is exposed to the light emitted by the LED lamp L2, the image sensor 131 detects the flicker frequency of the LED lamp L2 and generates a navigation signal according to the detected flicker frequency. After receiving the navigation signal, the navigation module 133 can learn that the flicker frequency corresponding to the navigation signal is the flicker frequency of the LED lamp L2 by checking the look-up table. In this manner, the navigation module 133 can determine that the portable electronic device 130 is within the irradiation range of the LED lamp L2 according to the location information of the portable electronic device 130. The above examples are only for illustrating but not for restricting the instant disclosure.

In order to further illustrate the operation method applied to the portable electronic device 130, another embodiment is provided as below. Referring to FIG. 15, FIG. 15 shows a flow chart of an operation method applied to a portable electronic device of still another embodiment of the instant disclosure. The method of this embodiment is executable for a portable electronic device 130 as shown in FIGS. 13 and 14, and thus please refers to FIGS. 13 and 14 for better understanding.

Is step S151, the image sensor 131 is turned on to continually capture a first image outside the body 21. In addition, the image sensor 131 detects the flicker frequency of the first image, and generates a navigation signal according to the detected flicker frequency. The first image has a first resolution. After that, in step S153, the navigation module 133 receives the navigation signal from the image sensor 131, and determines a location information of the portable electronic device 130 according to the navigation signal.

It should be noted that, the adjective "always on" refers to a function that the image sensor is always turned on and capturing images when the portable electronic device is operated in specific state (e.g., the suspend state). However, the image frames captured by the image sensor can be consecutive or not consecutive. In other words, there can be no time interval between the captured image frames or there can be a time interval between the captured image frames.

For the portable electronic device 130 provided by this embodiment, the built-in image sensor 131 can detect the flicker frequency according to the ambient light, wherein the flicker frequency varies with the ambient light in different areas. After that, the navigation module 133 can obtain a location information of the portable electronic device 130 according to the detected flicker frequency. Moreover, the flicker frequency can be also defined as the coding data for the data transmission used in the navigation or the broadcasting, and thus the image sensor 131 of the portable electronic device 130 can be also used in indoor navigation or indoor broadcasting.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A portable electronic device, operating in a suspend state and a work state, comprising:
    a body;
    a screen;
    a camera, being turned off when the portable electronic device is switched from the work state to the suspend state;
    a main system;
    an image sensor, being always on to capture a first image outside the body with a fist resolution and a first power consumption and to detect whether there is a face image information in the first image,
    wherein the camera is turned on in the suspend state of the portable electronic device by the main system to capture a second image outside the body with a second power consumption and a second resolution only when the face image information appeared for over two seconds on the screen is detected by the image sensor from the first image,
    wherein the second resolution is higher than the first resolution, and the second power consumption is higher than the first power consumption; and
    a recognition module, activated by the main system: in response to recognizing at least one facial feature in the second image according to a predetermined-condition detected, unlocking the screen and triggering the portable electronic device to enter the work state from the suspend state to execute a function or a service, wherein the predetermined condition is associated with a legal identification matching between the at least one facial feature and the face image information.

2. The portable electronic device according to claim 1, wherein the image sensor is switched to a power-saving mode after the portable electronic device enters the work state.

3. The portable electronic device according to claim 1, wherein the camera is turned off when the recognition module does not recognize the facial feature in the second image.

4. An operation method, applied to a portable electronic device, wherein the portable electronic device operates in a suspend state and a work state, and the portable electronic device comprises a body, a screen, a main system, an image sensor, a camera and a recognition module, the operation method comprising:
    turning off the camera when the portable electronic device switched from the work state to the suspend state;
    using the image sensor that is always on to capture a first image outside the body with a first resolution and a first power consumption and to detect whether there is a face image information in the first image, wherein first image has a first resolution;
    turning on the camera in the suspend state of the portable electronic device, by the main system, to capture a second image outside the body with a second power consumption and a second resolution only when the face image information appeared for over two seconds on the screen is detected by the image sensor from the first image, wherein the second resolution is higher than the first resolution, and the second power consumption is higher than the first power consumption; and
    activating the recognition module by the main system: in response to recognizing at least one facial feature in the second image according to a predetermined condition detected, unlocking the screen and triggering the portable electronic device to enter the work state from the suspend state to execute a function or a service,
    wherein the predetermined condition is associated with a legal identification matching between the at least one facial feature and the face image information.

5. The operation method according to claim 4, wherein the image sensor is switched to a power-saving mode after the portable electronic device enters the work state.

6. The operation method according to claim 4, wherein the camera is turned off when the recognition module does not recognize the facial feature in the second image.

7. A portable electronic device, operating in a suspend state and a work state, comprising:
    a body;
    a screen;
    a camera, being turned off when the portable electronic device is switched from the work state to the suspend state;
    an image sensor, being always on to capture a first image outside the body with a first resolution and a first power consumption and to detect whether there is a face image information in the first image,
    wherein the camera is turned on in the suspend state of the portable electronic device to capture a second image outside the body with a second power consumption and a second resolution only when the face image information is detected by the image sensor from the first image, the second resolution is higher than the first resolution, and the second power consumption is higher than the first power consumption; and a recognition module: in response to recognizing at least one facial feature in the second image according to a predetermined condition detected, unlocking the screen and triggering the portable electronic device to enter the work state from the suspend state to execute a function or a service, wherein the predetermined condition is associated with a legal identification matching between the at least one facial feature and the face image information.

* * * * *